(12) United States Patent
Coney

(10) Patent No.: US 7,274,621 B1
(45) Date of Patent: Sep. 25, 2007

(54) SYSTEMS AND METHODS FOR FLOW MEASUREMENT

(75) Inventor: William B. Coney, Littleton, MA (US)

(73) Assignee: BBN Technologies Corp., Cambridge, MA (US)

( * ) Notice: Subject to any disclaimer, the term of this patent is extended or adjusted under 35 U.S.C. 154(b) by 224 days.

(21) Appl. No.: 10/421,065

(22) Filed: Apr. 23, 2003

Related U.S. Application Data

(63) Continuation-in-part of application No. 10/170,865, filed on Jun. 13, 2002, now Pat. No. 6,859,420.

(60) Provisional application No. 60/392,157, filed on Jun. 27, 2002.

(51) Int. Cl.
*G01F 1/20* (2006.01)
*G01F 1/66* (2006.01)
*G01P 5/00* (2006.01)

(52) U.S. Cl. .......... 367/99; 73/170.11; 73/861.18; 73/861.21; 73/170.13

(58) Field of Classification Search .......... 73/861.18, 73/861.21, 170.11, 170.13; 367/99
See application file for complete search history.

(56) References Cited

U.S. PATENT DOCUMENTS

| | | |
|---|---|---|
| 1,345,717 A | 7/1920 | Thomas |
| 2,200,097 A | 5/1940 | Phelps |
| 2,307,792 A | 1/1943 | Hoover, Jr. |
| 2,325,424 A | 7/1943 | Rettinger |
| 2,411,117 A | 11/1946 | Scherbatskoy |
| 2,417,077 A | 3/1947 | Hoover, Jr. |
| 2,520,706 A | 8/1950 | Anderson et al. ............ 181/33 |
| 2,645,123 A * | 7/1953 | Hundstad ................ 73/170.14 |
| 2,772,746 A | 12/1956 | Merten |
| 2,776,010 A | 1/1957 | Rike |
| 3,067,404 A | 12/1962 | Hildebrandt |
| 3,154,171 A | 10/1964 | Knutson et al. ............ 181/31 |
| 3,476,208 A | 11/1969 | Sellman et al. ............ 181/0.5 |
| 3,479,886 A | 11/1969 | Canfield |
| 3,550,720 A | 12/1970 | Ballard et al. ............ 181/31 |

(Continued)

FOREIGN PATENT DOCUMENTS

JP 359217122 A 12/1984

OTHER PUBLICATIONS

L. Beranek, Acoustical Measurements, published for the Acoustical Society of America by the American Institute of Physics, Revised Edition, pp. 258-263.

(Continued)

*Primary Examiner*—Ian J. Lobo
(74) *Attorney, Agent, or Firm*—Fish & Neave IP Group Ropes & Gray LLP

(57) ABSTRACT

A system estimates flow parameters associated with a fluid flow encountering a bluff body. The system includes multiple sensors distributed on a surface of a bluff body. The system further includes input circuitry and a sensor processing unit. The input circuitry receives a signal from each of the multiple sensors. The sensor processing unit determines noise levels associated with each of the multiple sensors due to the fluid flow encountering the bluff body. The sensor processing unit further assigns weights to each of the multiple sensors based on the determined noise levels and estimates the fluid flow direction based on the assigned weights.

51 Claims, 7 Drawing Sheets

U.S. PATENT DOCUMENTS

| | | | |
|---|---|---|---|
| 3,572,462 A | 3/1971 | Gray | |
| 3,953,829 A | 4/1976 | Boyle | |
| 3,992,951 A | 11/1976 | Erspamer et al. | |
| 4,020,919 A | 5/1977 | Broding | |
| 4,065,648 A | 12/1977 | Cvetko et al. | |
| 4,153,815 A | 5/1979 | Chaplin et al. | 179/1 |
| 4,159,464 A | 6/1979 | Hall, Jr. | |
| 4,352,254 A | 10/1982 | Peter et al. | |
| 4,382,201 A | 5/1983 | Trzaskos | |
| 4,570,746 A | 2/1986 | Das et al. | 181/242 |
| 4,600,077 A | 7/1986 | Drever | |
| 4,625,201 A | 11/1986 | Berry | |
| 4,625,827 A | 12/1986 | Barlett | |
| 4,692,912 A | 9/1987 | Mueller et al. | |
| 4,750,157 A | 6/1988 | Shei | |
| 4,764,908 A | 8/1988 | Greer, Jr. | |
| 4,899,845 A | 2/1990 | Bosco et al. | |
| 5,010,531 A | 4/1991 | McNeel | |
| 5,150,104 A | 9/1992 | Thomas et al. | |
| 5,231,252 A | 7/1993 | Sansone | |
| 5,288,955 A | 2/1994 | Staple et al. | |
| 5,339,287 A | 8/1994 | Bauer | 367/140 |
| 5,339,292 A | 8/1994 | Brown et al. | |
| 5,343,744 A * | 9/1994 | Ammann | 73/170.13 |
| 5,398,035 A | 3/1995 | Densmore et al. | |
| 5,435,178 A * | 7/1995 | Edwards | 73/170.15 |
| 5,444,790 A | 8/1995 | Kogen | |
| 5,457,995 A | 10/1995 | Staton et al. | |
| 5,469,408 A | 11/1995 | Woo | |
| 5,473,702 A | 12/1995 | Yoshida et al. | |
| 5,477,506 A | 12/1995 | Allen | 367/140 |
| 5,492,016 A | 2/1996 | Pinto et al. | |
| 5,684,756 A | 11/1997 | Schmitz et al. | 367/188 |
| 5,808,243 A | 9/1998 | McCormick et al. | 181/0.5 |
| 5,917,921 A | 6/1999 | Sasaki et al. | 381/94 |
| 5,929,754 A | 7/1999 | Park et al. | |
| 5,978,317 A | 11/1999 | Whitener | |
| 5,996,441 A | 12/1999 | Bateman | |
| 6,320,968 B1 | 11/2001 | Linder | 381/94.7 |
| 6,393,913 B1 | 5/2002 | Dyck et al. | |
| 6,502,459 B1 * | 1/2003 | Bonne et al. | 73/170.11 |
| 6,507,790 B1 | 1/2003 | Radomski | |
| 6,538,612 B1 | 3/2003 | King | |
| 6,604,432 B1 | 8/2003 | Hamblen et al. | |
| 6,609,069 B2 * | 8/2003 | Gysling | 73/861.06 |
| 6,805,008 B2 | 10/2004 | Selvakumar et al. | |
| 6,854,330 B2 | 2/2005 | Potter | |
| 6,935,458 B2 | 8/2005 | Owens | |
| 6,963,649 B2 | 11/2005 | Vaudrey et al. | |
| 6,978,673 B2 | 12/2005 | Johnson et al. | |
| 2002/0104379 A1 | 8/2002 | Ried et al. | |
| 2003/0179103 A1 | 9/2003 | Kamata | |
| 2005/0171710 A1 * | 8/2005 | Gysling et al. | 702/54 |
| 2006/0013425 A1 | 1/2006 | Kargus et al. | |

OTHER PUBLICATIONS

J. Bleazey, "Experimental Determination of the Effectiveness of Microphone Wind Screens", Journal of the Audio Engineering Society, vol. 9, No. 1, Jan. 1961, pp. 48-54.

W. Neise, "Theoretical and Experimental Investigations of Microphone Probes for Sound Measurements in Turbulent Flow", Journal of Sound and Vibration, 39(3), 1975, pp. 371-400.

M. Shust et al., "Electronic Removal of Outdoor Microphone Wind Noise", Acoustical Society of America 136th Meeting Lay Language Papers, Norfolk, VA, Oct. 1998, pp. 1-5.

William B. Coney et al.; A Semi-Empirical Approach for Modeling Greenhouse Surface Wind Noise; SAE Technical Paper Series; May 17-20, 1999; pp. 1-9.

U.S. Appl. No. 10/170,865, filed Jun. 13, 2002; William B. Coney et al.; Systems and Methods for Adaptive Wind Noise Rejection; 28 pages.

U.S. Appl. No. 10/171,923, filed Jun. 13, 2002; John C. Heine et al.; Systems and Methods for Adaptive Noise Cancellation; 32 pages.

Shust et al, "Electronic Removal of Outdoor Microphone Wind Noise," Acoustical Society of America; Presented Oct. 13, 1998; Published Jan. 11, 2002.

Bleazey, John C., "Experimental Determination of the Effectiveness of Microphone Wind Screens," Journal of the Audio Engineering Society; 9:48-54; Jan. 1961.

Beranek, Leo L., "Acoustical Measurements," Published for the Acoustical Soociety of America by the American Institute of Physics, 1988 Editions, pp. 258-263.

* cited by examiner

FIG. 5

NOISE LEVEL TO FLOW VELOCITY TABLE 500

| DOWNSTREAM SENSOR NOISE LEVELS 510 | | | FLOW VELOCITY 515 |
|---|---|---|---|
| $S_1\_NL_1$ | $S_2\_NL_1$ | $S_3\_NL_1$ | flow_velocity_1 |
| $S_1\_NL_1$ | $S_2\_NL2$ | $S_3\_NL1$ | flow_velocity_2 |
| $S_1\_NL_1$ | $S_2\_NL_2$ | $S_3\_NL_2$ | flow_velocity_3 |
| --- | --- | --- | --- |
| $S_1\_NL_x$ | $S_2\_NL_x$ | $S_3\_NL_x$ | flow_velocity_4 |
| $S_2\_NL_1$ | $S_3\_NL_1$ | $S_4\_NL_1$ | flow_velocity_5 |
| $S_2\_NL_1$ | $S_3\_NL_2$ | $S_4\_NL_1$ | flow_velocity_6 |
| $S_2\_NL_1$ | $S_3\_NL_2$ | $S_4\_NL_2$ | flow_velocity_7 |
| --- | --- | --- | --- |
| $S_N\_NL_x$ | $S_1\_NL_x$ | $S_2\_NL_x$ | flow_velocity_8 |

TABLE ENTRIES 505

SYSTEMS AND METHODS FOR FLOW MEASUREMENT

CROSS REFERENCE TO RELATED APPLICATIONS

The instant application claims priority from provisional application No. 60/392,157, filed Jun. 27, 2002, the disclosure of which is incorporated by reference herein in its entirety.

The instant application is a continuation-in-part of application Ser. No. 10/170,865, entitled "Systems and Methods for Adaptive Wind Noise Rejection," filed Jun. 13, 2002 now U.S. Pat. No. 6,859,420, the disclosure of which is incorporated by reference herein.

RELATED APPLICATION

The instant application is related to co-pending application Ser. No. 10/171,293, entitled "Systems and Methods for Adaptive Noise Cancellation," filed Jun. 13, 2002, the disclosure of which is incorporated by reference herein.

FIELD OF THE INVENTION

The present invention relates generally to systems and methods for flow measurement and, more particularly, to systems and methods for employing multiple sensors in a flow measurement system.

BACKGROUND OF THE INVENTION

A number of conventional systems detect, classify, and track air and ground bodies or targets. The sensing elements that permit these systems to perform these functions are typically arrays of microphones whose outputs are processed to reject coherent interfering acoustic noise sources, such as nearby machinery, general acoustic background noise, and wind noise. The propagation of sound and, thus, the passive acoustic detection of targets, is typically governed in part by local and regional weather conditions, such as wind and temperature. Knowledge of wind speed and direction can, thereby, be used to improve the estimate of the detection range for a given target and sensor pairing. Environmental sensors are, for this reason, often considered for inclusion in the design of ground sensor packages or suites of field sensors. Similarly, measurement of local weather conditions are often undertaken as part of the assessment of the noise impact of facilities such as airports on the environment or on nearby communities. In each of these cases there is a need to measure wind speed and direction along with sound levels.

Therefore, there exists a need for systems and methods that can combine the measurement of flow speed and direction along with the measurement of acoustic levels in a single device that may be more compact and potentially energy efficient than if these functions were incorporated within separate devices.

SUMMARY OF THE INVENTION

Systems and methods consistent with the present invention address this and other needs by providing a multi-sensor assembly, and associated circuitry, that may be employed for estimating fluid flow speeds and directions for possible use in acoustic detection systems, such as, for example, acoustic target detection systems and acoustic level measurement systems. As one example, systems and methods consistent with the present invention may be combined with the systems disclosed in the co-pending application Ser. Nos. 10/170,865 and 10/171,293 referenced above.

Consistent with the present invention, multiple sensors may be distributed across a surface of a three-dimensional bluff body, such as a sphere, cylinder, or cone. Weights may be assigned to the signal output from each of the multiple sensors based on, for example, noise levels associated with each of the sensors. A geometric center of the assigned weights may then be determined to estimate a flow direction of a fluid flow encountering the bluff body. Furthermore, sensors located on a downstream face of the bluff body may be identified, and the noise levels associated with each of the identified downstream sensors may be used to perform a look-up into a table to retrieve a fluid flow velocity that corresponds to the noise levels. The table may store arrays of noise levels that have been determined analytically, or experimentally, through testing of the multi-sensor assembly in fluid flows of varying velocities.

In accordance with the purpose of the invention as embodied and broadly described herein, a method of estimating fluid flow direction includes distributing multiple sensors over a surface of a body and determining noise levels associated with each of the multiple sensors due to a fluid flow across the surface of the body. The method further includes assigning weights to each of the multiple sensors based on the determined noise levels and estimating the fluid flow direction based on the assigned weights.

In another implementation consistent with the present invention, a method of estimating fluid flow velocity includes distributing multiple sensors over a surface of a body and determining noise levels associated with at least a portion of the multiple sensors due to a fluid flow across the surface of the body. The method further includes estimating a velocity of the fluid flow based the determined noise levels.

BRIEF DESCRIPTION OF THE DRAWINGS

The accompanying drawings, which are incorporated in and constitute a part of this specification, illustrate embodiments of the invention and, together with the description, explain the invention. In the drawings.

FIG. 5 illustrates a data table for deriving fluid flow velocity from multiple sensor noise levels consistent with the present invention;

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Systems and methods, consistent with the present invention, provide mechanisms that estimate flow direction and/or flow velocity of a fluid flow encountering a multi-sensor assembly. The multi-sensor assembly, consistent with the invention, may be employed in acoustic detection systems, such as, for example, acoustic target detection systems and acoustic level measurement systems.

Analysis and experiment have shown that the turbulent or separated flow acting on a surface, such as a surface of a multi-sensor assembly consistent with the present invention, may be determined by the flow geometry, some appropriate length scale L associated with the flow, the maximum flow velocity U driving the shear flow, and the associated maximum dynamic pressure, $q=\frac{1}{2}\rho U^2$, where $\rho$ is the fluid density. Based on these parameters, it is possible to normalize the pressure spectra of similar turbulent or separated flows. The appropriate normalized frequency ($\hat{\omega}$) is given by a Strouhal scaling based upon the time scale associated with the largest expected turbulent eddies:

$$\hat{\omega} = \frac{\omega L}{U} \quad \text{Eqn. (1)}$$

The pressure spectrum is then normalized as $$\hat{\Phi}_{pp}(\hat{\omega}) = \frac{\Phi_{pp}(\omega)U}{q^2 L} = \frac{\Phi_{pp}(\omega)}{U^3 \rho^2 L} \quad \text{Eqn. (2)}$$

where $\Phi_{pp}(\omega)$ is the autospectrum of the fluctuating flow pressures. As a result, the sound pressure level (in dB) on any individual sensor of a multi-sensor assembly consistent with the present invention, subject to turbulent flow as given by $20\log\Phi_{pp}$, is expected to increase with $60\log U$. For flow from some fixed direction acting on a multi-sensor assembly, we can, therefore, relate the pressure measured on any individual sensor to the flow speed. Thus, wind velocity may be determined, consistent with the invention, from the magnitude of the unsteady pressure (i.e., the noise level).

Exemplary Multi-Sensor Assembly

Figure 1:
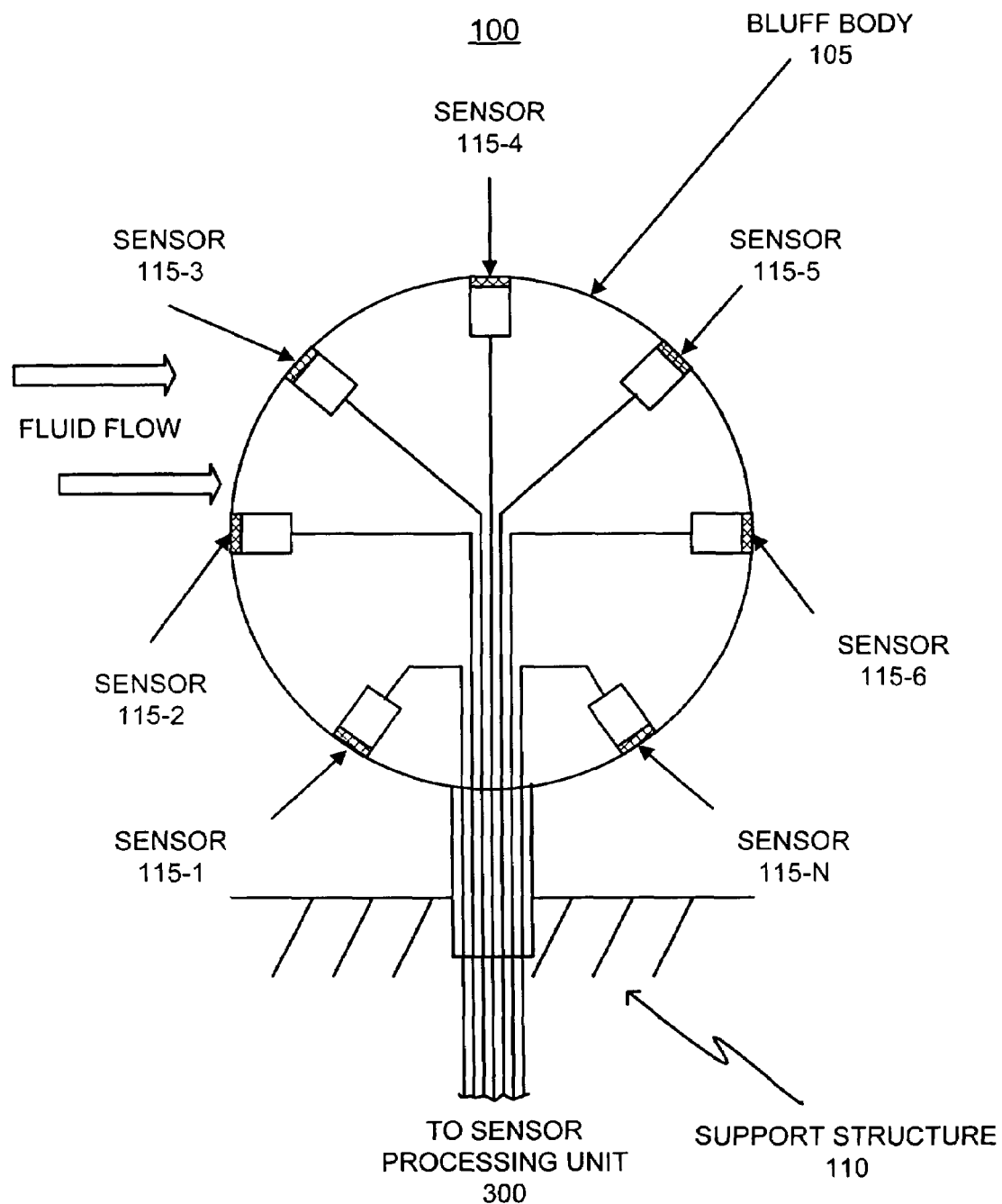
FIG. 1 illustrates an exemplary multi-sensor assembly consistent with the present invention.

FIG. 1 illustrates an exemplary multi-sensor assembly 100 consistent with the present invention. Multi-sensor assembly 100 may include a bluff body 105 coupled to a support structure 110. As illustrated, bluff body 105 may be configured as a three dimensional sphere. Bluff body 105 may, alternatively, be configured as a three dimensional cylinder, cone or other shape (not shown). Bluff body 105 may further be constructed of a rigid, semi-rigid, or solid material. Bluff body 105 may also be constructed of a permeable or non-permeable material. For example, bluff body 105 may be constructed of foam and, thus, would be semi-rigid and permeable to fluids such as air or water. As an additional example, bluff body 105 may be constructed of a solid material such as plastic or the like that would be rigid and non-permeable to fluids.

As shown in FIG. 1, multiple sensors (sensor 115-1 through sensor 115-N) may be distributed on a surface of bluff body 105. As further illustrated in FIG. 2, the multiple sensors 115 may be distributed around an equator of a spherical bluff body 105. One skilled in the art will recognize, also, that other sensor distributions may be possible. For example, sensors 115 may be distributed at icosahedral points (not shown) on the surface of spherical bluff body 105. Distribution of the sensors across a surface of bluff body 105 can depend on the shape of the bluff body (e.g., spherical, cylindrical, conical) and the particular fluid flow anticipated upon bluff body 105.

Each of the multiple sensors 115 may include any type of conventional transducer for measuring force of pressure. A piezoelectric transducer (e.g., a microphone) is one example of such a conventional transducer. In some embodiments of the present invention, each of the multiple sensors 115 may measure acoustic and non-acoustic air pressure.

Exemplary Flow Direction Portion of Sensor Processing Unit

Figure 3:
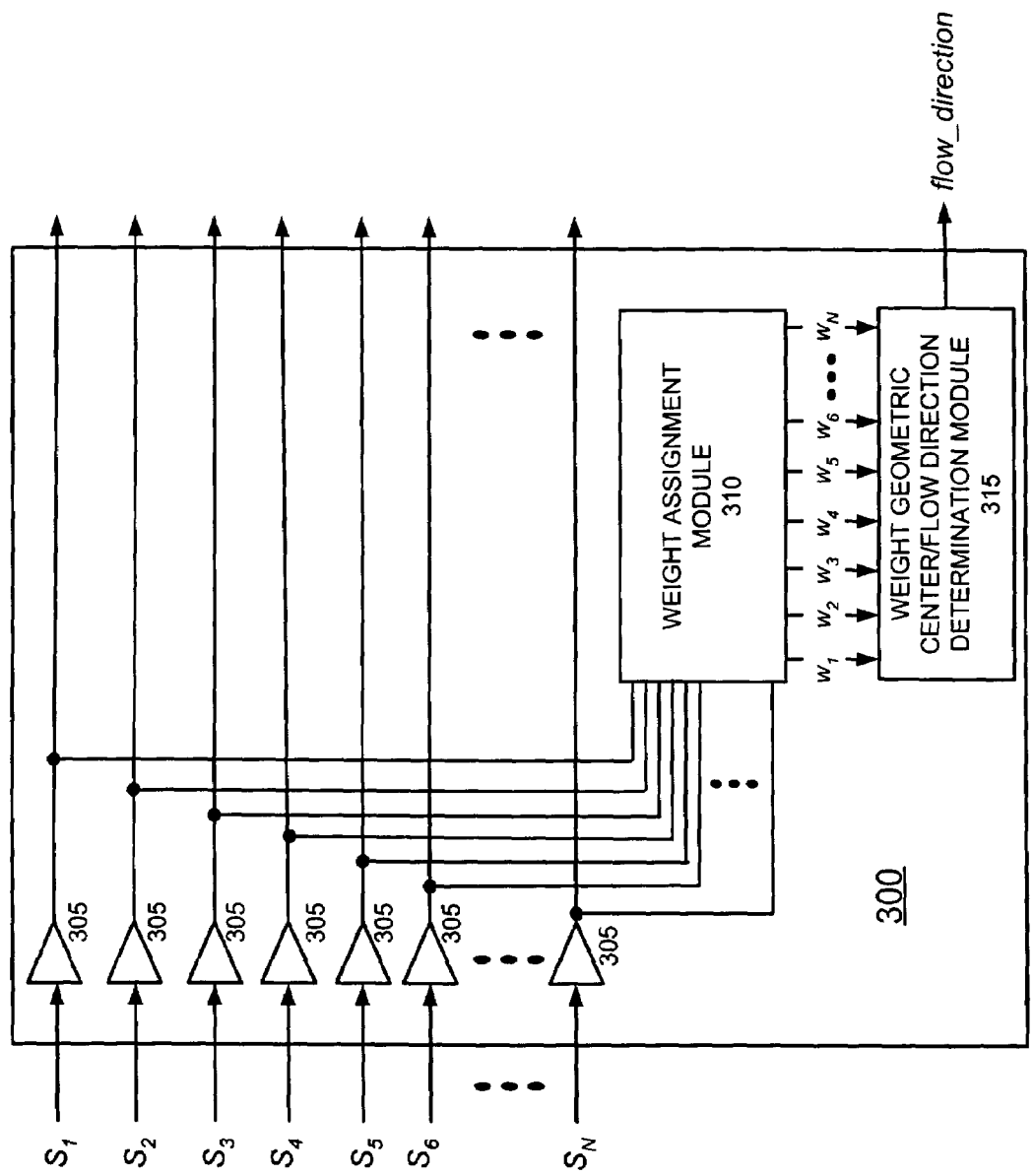
FIG. 3 illustrates exemplary components of a sensor processing unit consistent with one exemplary embodiment of the present invention.

FIG. 3 illustrates exemplary components of a sensor processing unit 300 in which systems and methods, consistent with the present invention, may be implemented for determining fluid flow direction at a multi-sensor device, such as multi-sensor assembly 100. Sensor processing unit 300 may include multiple input buffers 305, a weight assignment module 310 and a weight geometric center/flow direction determination module 315. Modules 310 and 315 may be implemented in software, hardware and/or firmware. If implemented in software, modules 310 and 315 may include instructions stored in a computer-readable medium, such as, for example, stored in or on random access memory (RAM), read only memory (ROM), a CD-ROM, or a diskette, for execution by a processing unit (not shown) such as, for example, a microprocessor.

Weights $\{w_1, w_2, \ldots, w_N\}$ assigned by weight assignment module 310 may be frequency dependent, and thus FIG. 3 represents one frequency "slice" of the entire frequency spectrum. A bank of sensor processing units 300 may be implemented, for example, in hardware or software, to cover the entire desired frequency band. Input buffers 305 may receive signals from each sensor 115 of multi-sensor assembly 100 and pass the signals to weight assignment module 310. Weight assignment module 310 may receive each signal $\{S_1, S_2, \ldots, S_N\}$ from multi-sensor assembly 105 and, according to a process, such as the exemplary process described with respect to FIG. 4 below, assign weights $\{w_1, w_2, w_3, \ldots, w_N\}$ to each of the sensor signals. The assigned weights $\{w_1, w_2, w_3, \ldots, w_N\}$ may be passed to weight geometric center/flow direction determination module 315. Module 315 may determine a geometric center of the assigned sensor weights to estimate a flow direction value (flow_direction) associated with a fluid flow encountering bluff body 105.

Exemplary Flow Direction Estimation Process

Figure 2:
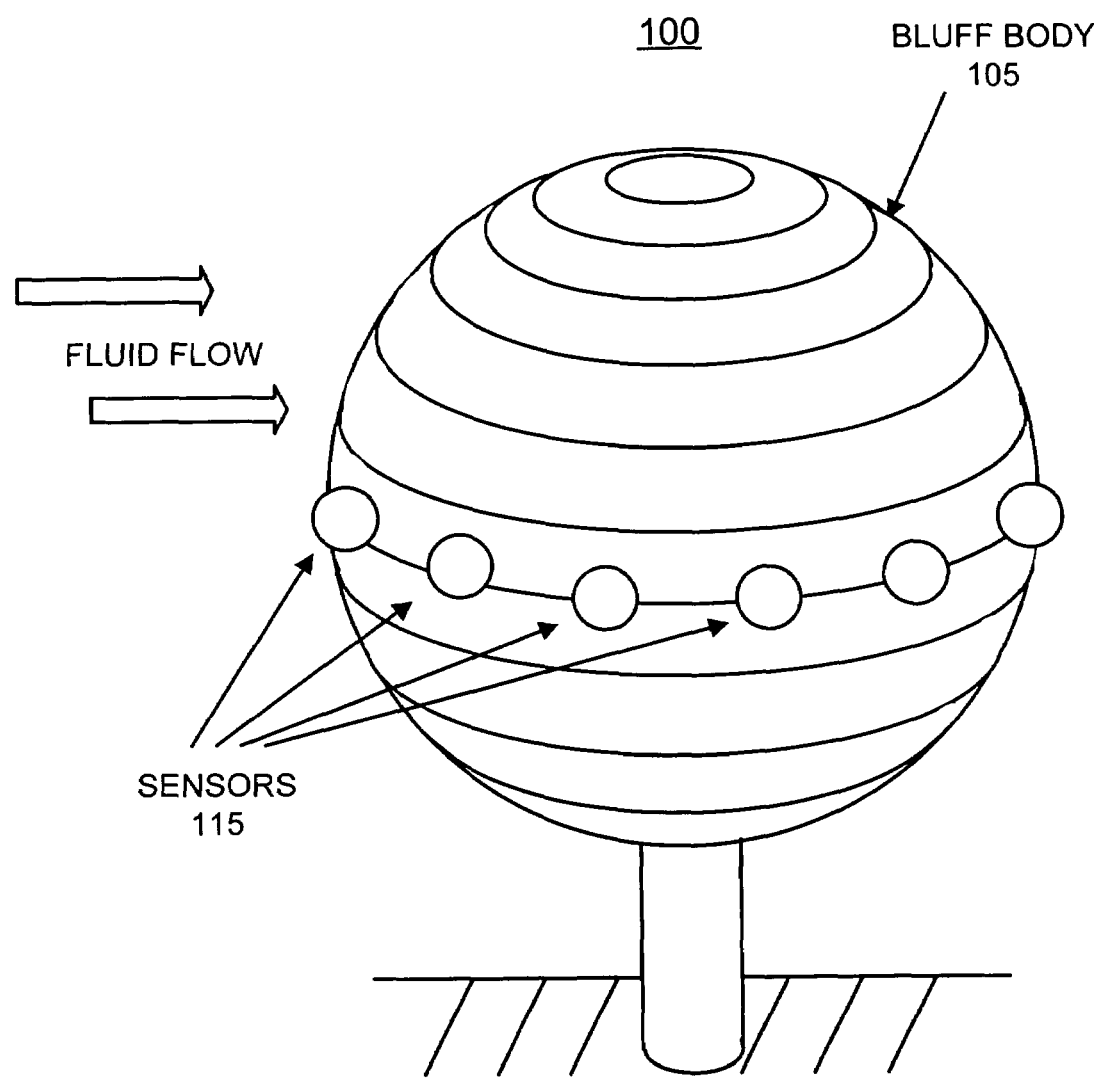
FIG. 2 illustrates an exemplary multi-sensor assembly with a spherical bluff body and equatorially distributed sensors consistent with the present invention.
Figure 4:
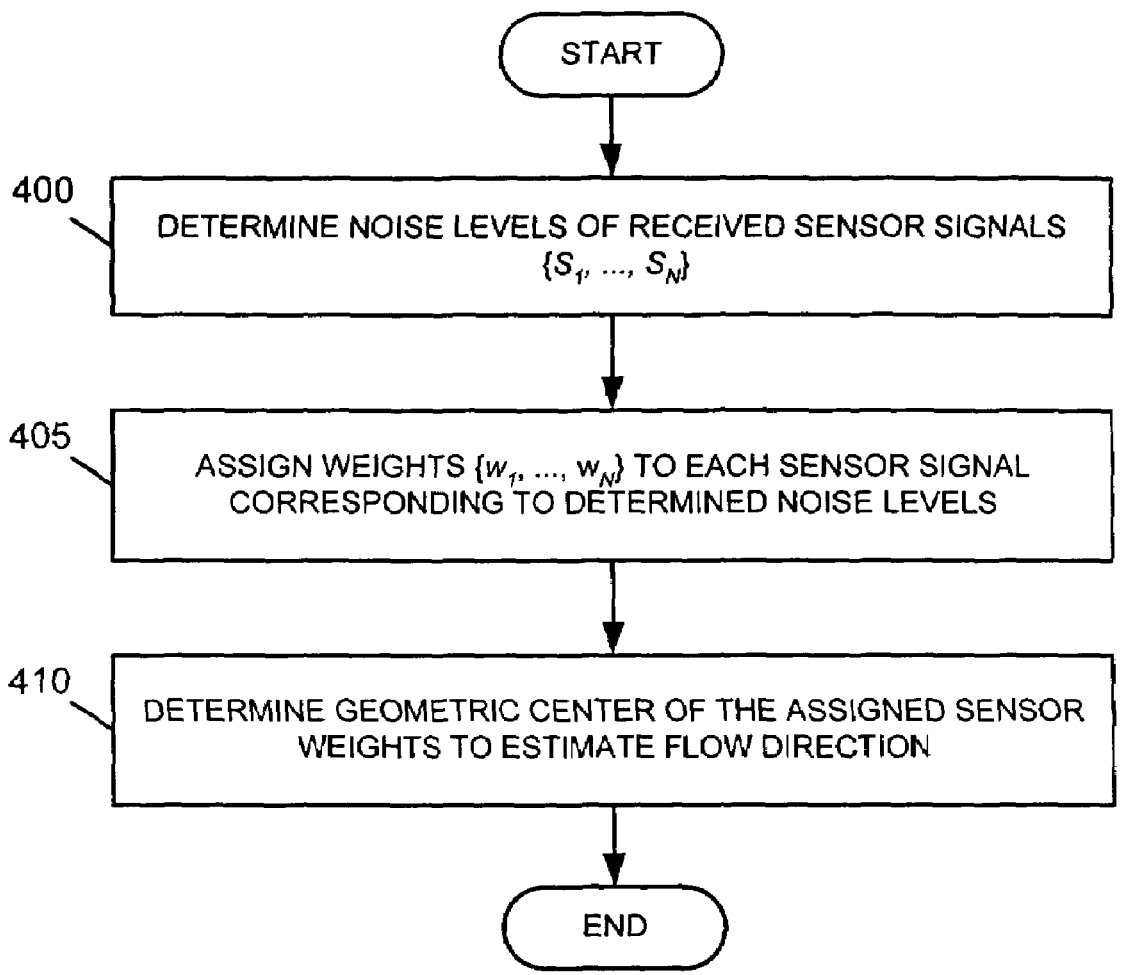
FIG. 4 is a flowchart that illustrates an exemplary process for estimating flow direction consistent with the present invention.

FIG. 4 illustrates an exemplary process, consistent with the present invention, for estimating flow direction of a fluid flow encountering bluff body 105 (such as shown in FIG. 2). The exemplary process may begin by determining noise levels associated with sensor signals $\{S_1, S_2, \ldots, S_N\}$ received from sensors 115 [act 400]. To determine the noise levels, module 310 may measure the noise, such as, for example, a root-mean-square (RMS) noise level, associated with each of the received sensor signals. Module 310 may then assign weights $\{w_1, w_2, w_3, \ldots, w_N\}$ to each sensor signal based on the measured noise levels [act 405]. For example, large weights may be assigned to high noise sensor signals and low weights be assigned to low noise sensor signals. Signals from sensors subjected to high levels of unsteady pressures due to turbulence and wake flow may, thus, be assigned large weights, while signals from sensors located a distance away from the flow disturbances may be assigned small weight values. In some embodiments, for example, the weights may be assigned by module 315 as being proportional to the measured noise level (e.g., proportional to the RMS noise level of each sensor signal).

Module 315 may then receive the assigned weights $\{w_1, w_2, w_3, \ldots, w_N\}$ from weight assignment module 310 and determine the geometric center of the assigned sensor weights to estimate the direction of the flow encountering bluff body 105 [act 410]. The geometric center of the assigned sensor weights may, for example, be designated as the direction of the fluid flow encountering bluff body 105. Module 315 may designate the estimated fluid flow direction as the flow_direction value.

Exemplary Noise Level to Flow Velocity Table

FIG. 5 illustrates an exemplary table 500 that indicates, consistent with the present invention, a fluid velocity that corresponds to noise levels measured at multiple sensors 115 located on a downstream face of bluff body 105. Table 500 may be stored in a memory device associated with sensor processing unit 300. Table 500 may include multiple entries 505, each of which may include an array of downstream sensor noise levels 510, and a corresponding flow velocity value 515 that indicates a flow velocity associated with the noise level values designated in the array of downstream sensor noise levels 510. Each noise level in any array of downstream sensor noise levels 510 may be determined analytically, or experimentally through testing of multi-sensor assembly 100 in fluid flows of varying velocities.

Exemplary Flow Velocity Portion of Sensor Processing Unit

Figure 6:
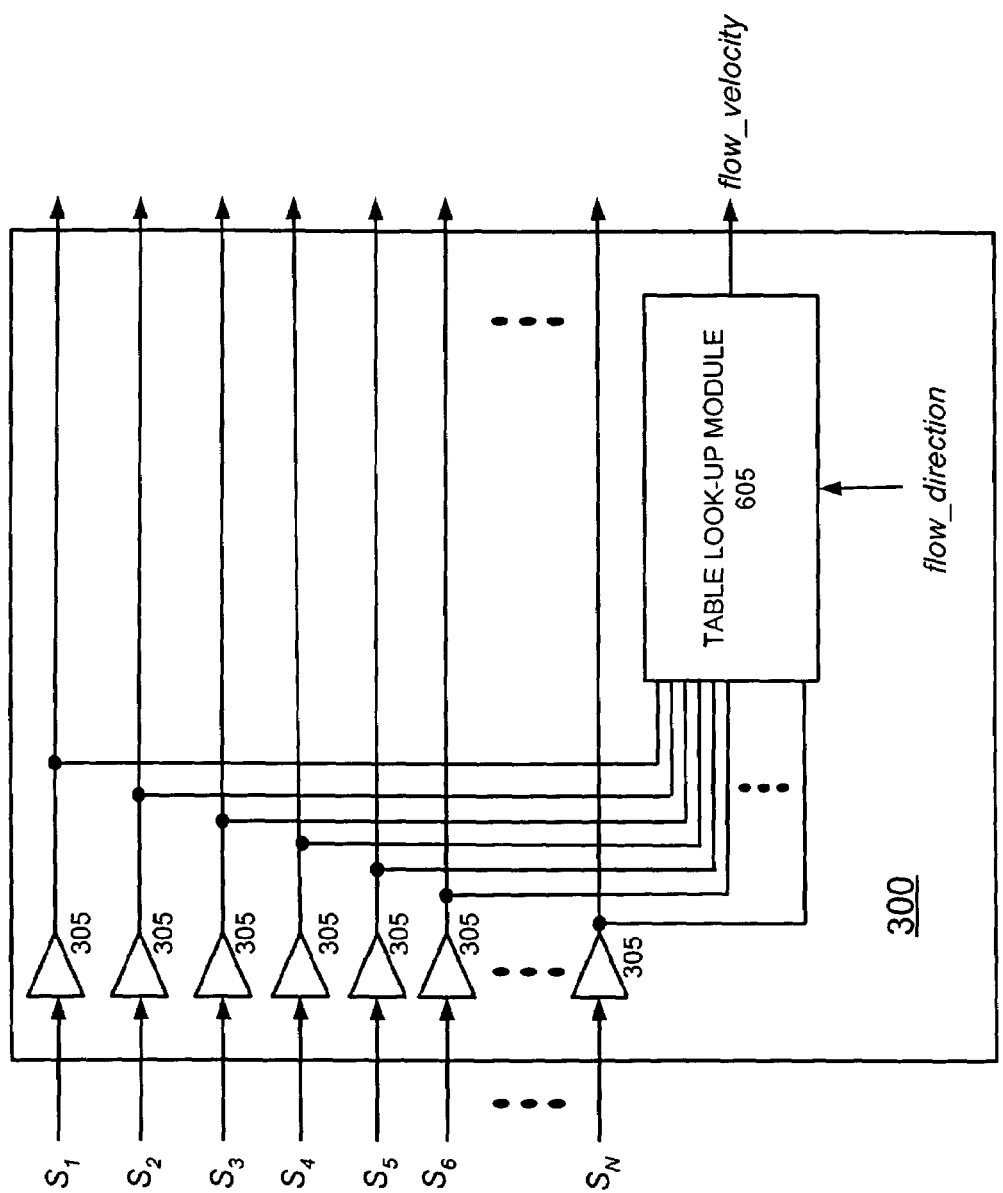
FIG. 6 illustrates exemplary components of a sensor processing unit consistent with another exemplary embodiment of the present invention.

FIG. 6 illustrates additional exemplary components of sensor processing unit 300 in which systems and methods, consistent with the present invention, may be implemented for determining a velocity of a fluid flow encountering a multi-sensor device, such as multi-sensor assembly 100. Sensor processing unit 300 may include multiple input buffers 305 and a table look-up module 605. Table look-up module 605 may be implemented in software, hardware and/or firmware. If implemented in software, module 605 may include instructions stored in a computer-readable medium, such as, for example, stored in or on random access memory (RAM), read only memory (ROM), a CD-ROM, or a diskette, for execution by a processing unit (not shown) such as, for example, a microprocessor.

Input buffers 305 may receive signals from each sensor 115 of multi-sensor assembly 100 and pass the signals to table look-up module 605. Table look-up module 605 may receive a flow direction value (flow_direction) from weight geometric center/flow direction determination module 315 (see FIG. 3). Module 605 may use the received flow direction value to identify particular sensors 115 located on a downstream face of bluff body 105. Module 605, thus, relates the received flow direction to appropriate sensors 115 that are located on a face of bluff body 105 in the direction of the fluid flow. Module 605 may determine noise levels associated with each of the identified sensors 115 and perform a look-up of noise level to flow velocity table 500 to determine a corresponding flow velocity value 515. To determine the noise levels, module 605 may measure the noise, such as, for example, a root-mean-square (RMS) noise level, associated with each of the received sensor signals.

Exemplary Flow Direction Estimation Process

Figure 7:
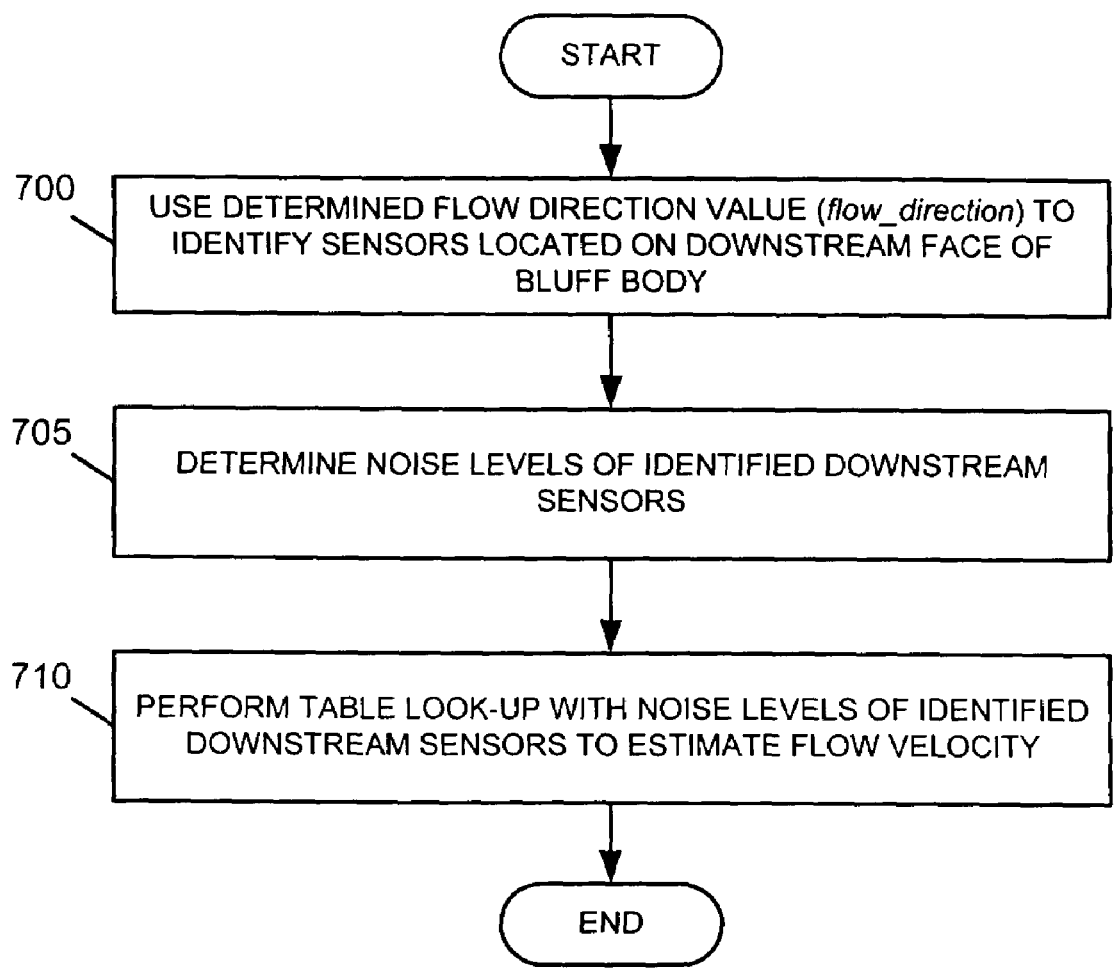
FIG. 7 is a flowchart that illustrates an exemplary process for estimating flow velocity consistent with the present invention.

FIG. 7 illustrates an exemplary process, consistent with the present invention, for estimating flow velocity of a fluid flow encountering bluff body 105. The exemplary process may begin with module 605 identifying sensors located on a downstream face of bluff body 105 using, for example, the flow direction value (flow_direction) determined in the exemplary process of FIG. 4 above [act 700]. The flow direction identified by flow_direction may correspond to a number of sensors 115 that are located at a position on bluff body 105 that coincides with the flow direction. Module 605 may then determine noise levels associated with the identified downstream sensors [act 705]. To determine the noise levels, module 605 may measure the noise, such as, for example, the root-mean-square (RMS) noise level, associated with each of the identified downstream sensors. Module 605 may perform a look-up in noise level to flow velocity table 500, with the determined noise levels, to retrieve a flow velocity value 515 that corresponds to the estimated flow velocity [act 710]. For example, if sensor 115-1, sensor 115-2 and sensor 115-3 are identified as being located on a downstream face of bluff body 105, and noise level $S_1\_NL_1$ is measured at sensor 115-1, noise level $S_2\_NL_1$ is measured at sensor 115-2 and noise level $S_3\_NL_1$ is measured at sensor 115-3, then module 505 may retrieve flow_velocity_1 value 515 from an entry of table 500 whose noise level array 510 includes noise levels $S_1\_NL_1$, $S_2\_NL_1$ and $S_3\_NL_1$.

Alternatively, instead of performing a look-up in noise level to flow velocity table 500, module 605 may calculate a flow velocity using the determined noise level(s) of one or more identified downstream sensors [act 715]. The flow velocity may be calculated using a curve fit to noise measured on a downstream face of bluff body 105 as a function of velocity as determined from calibration testing. In one embodiment, this curve may be of the following form, with the noise level (L) increasing with the $6^{th}$ power of the flow velocity:

$$L = 60 \log \frac{U}{U_o} \qquad \text{Eqn. (3)}$$

where L is the noise level in dB;
U is the flow velocity;
$U_o$ is a value chosen to best fit the calibration data.

Thus, solving for the flow velocity (U) as a function of L and $U_o$ results in the following:

$$U = U_o * \left(10^{\frac{L}{60}}\right) \qquad \text{Eqn. (4)}$$

Module 605 may, therefore, calculate the flow velocity (U) at any sensor 115 using, for example, the functional relationship established by Eqn. (4).

CONCLUSION

In conjunction with multiple sensors distributed over a surface of the multi-sensor assembly, systems and methods, consistent with the present invention, provide mechanisms that estimate flow direction and/or flow velocity of a fluid flow encountering the multi-sensor assembly. Systems and methods, consistent with the present invention, may, in some embodiments, be employed in acoustic detection systems, such as, for example, acoustic target detection systems and acoustic level measurement systems to incorporate additional flow velocity and flow direction determination functionality.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible. Additionally, while some embodiments of the invention has been described as determining flow velocity from the magnitude of the unsteady pressure, in other exemplary embodiments the flow velocity may be determined from both the magnitude and the shape and center frequency of the pressure spectrum of the fluid flow. Also, while series of acts have been described with regard to FIGS. 4 and 7, the order of the acts may be altered in other implementations. No element, step, or instruction used in the description of the present application should be construed as critical or essential to the invention unless explicitly described as such. The scope of the invention is defined by the following claims and their equivalents.

What is claimed is:

1. A method of estimating fluid flow parameters, comprising:
distributing a plurality of sensors over a surface of a body;
determining noise levels associated with each of the plurality of sensors due to a fluid flow encountering the body;
assigning weights to each of the plurality of sensors based on the determined noise levels; and
estimating fluid flow direction based on the assigned weights.

2. The method of claim 1, wherein assigning weights to each of the plurality of sensors further comprises:
assigning large weights to sensors of the plurality of sensors that are subject to high flow noise.

3. The method of claim 1, wherein assigning weights to each of the plurality of sensors further comprises:
assigning small weights to sensors of the plurality of sensors that are subject to low flow noise.

4. The method of claim 1, further comprising:
determining a geometric center of the assigned weights.

5. The method of claim 4, wherein estimating the fluid flow direction is further based on the determined geometric center of the assigned weights.

6. The method of claim 1, wherein the body comprises a three dimensional body.

7. The method of claim 6, wherein the three dimensional body comprises at least one of a sphere, a cylinder, and a cone.

8. The method of claim 1, wherein the determined noise levels comprise root-mean-square (RMS) noise levels.

9. The method of claim 1, wherein the body comprises a sphere and wherein distributing a plurality of sensors over a surface of the body further comprises:
distributing the plurality of sensors around an equator of the sphere.

10. The method of claim 1, wherein the body comprises a sphere and wherein distributing a plurality of sensors over a surface of the body further comprises:
distributing the plurality of sensors at icosahedral points on the sphere.

11. The method of claim 1, wherein the plurality of sensors comprise pressure sensors.

12. The method of claim 1, further comprising:
estimating a velocity of the fluid flow based on at least a portion of the determined noise levels.

13. The method of claim 1, further comprising:
identifying sensors of the plurality of sensors that are located on a downstream face of the body.

14. The method of claim 13, wherein determining noise levels further comprises:
determining noise levels associated with the identified sensors.

15. The method of claim 14, further comprising:
maintaining a look-up table that relates noise levels to fluid flow velocity values.

16. The method of claim 15, wherein estimating the velocity of the fluid flow further comprises:
referencing the look-up table with the determined noise levels associated with the identified sensors to retrieve a corresponding one of the fluid flow velocity values.

17. The method of claim 14, wherein estimating the velocity of the fluid flow further comprises:
calculating the velocity of the fluid flow using the determined noise levels and a function which relates noise levels to fluid flow velocities.

18. A system for estimating flow parameters associated with a fluid flow encountering a bluff body, comprising:
a plurality of sensors distributed on a surface of a bluff body;
input circuitry configured to receive signals from each of the plurality of sensors;
a sensor processing unit configured to:
determine noise levels associated with each of the signals from the plurality of sensors due to the fluid flow encountering the bluff body,
assign weights to each of the plurality of sensors based on the determined noise levels, and
estimate the fluid flow direction based on the assigned weights.

19. The system of claim 18, wherein the sensor processing unit is further configured to:
assign large weights to sensors of the plurality of sensors that are subject to high flow noise.

20. The system of claim 18, wherein the sensor processing unit is further configured to:
assign small weights to sensors of the plurality of sensors that are subject to low flow noise.

21. The system of claim 18, wherein the sensor processing unit is further configured to:
determine a geometric center of the assigned weights.

22. The system of claim 21, wherein the sensor processing unit is further configured to:
  estimate the fluid flow direction further based on the determined geometric center of the assigned weights.

23. The system of claim 18, wherein the bluff body comprises a three dimensional body.

24. The system of claim 23, wherein the three dimensional body comprises at least one of a sphere, a cylinder, and a cone.

25. The system of claim 18, wherein the determined noise levels comprise root-mean-square (RMS) noise levels.

26. The system of claim 18, wherein the plurality of sensors comprise pressure sensors.

27. The system of claim 18, wherein the sensor processing unit is further configured to:
  estimate a velocity of the fluid flow based on at least a portion of the determined noise levels.

28. The system of claim 18, wherein the sensor processing unit is further configured to:
  identify sensors of the plurality of sensors that are located on a downstream face of the bluff body.

29. The system of claim 28, wherein the sensor processing unit is further configured to:
  determine noise levels associated with the identified sensors.

30. The system of claim 29, wherein the sensor processing unit is further configured to:
  maintain a look-up table that relates noise levels to fluid flow velocity values.

31. The system of claim 30, wherein the sensor processing unit is further configured to:
  reference the look-up table with the determined noise levels to retrieve a corresponding one of the fluid flow velocity values.

32. The system of claim 29, wherein the sensor processing unit is further configured to:
  calculate the velocity of the fluid flow using the determined noise levels and a function which relates noise levels to fluid flow velocities.

33. A method of estimating fluid flow velocity, comprising:
  distributing a plurality of sensors on an external surface of a three dimensional body, wherein the plurality of sensors measure at least one of pressure or force applied to the external surface of the three dimensional body;
  determining noise levels associated with the pressure or force measured by at least a portion of the plurality of sensors due to a fluid flowing externally across the external surface of the body; and
  estimating a velocity of the fluid flow based on the determined noise levels.

34. The method of claim 33, further comprising:
  identifying sensors of the plurality of sensors that are located on a downstream face of the body.

35. The method of claim 34, wherein determining noise levels associated with at least a portion of the plurality of sensors further comprises:
  determining noise levels associated with the identified sensors.

36. The method of claim 33, wherein the three dimensional body comprises at least one of a sphere, a cylinder, and a cone.

37. The method of claim 33, further comprising:
  maintaining a look-up table that relates noise levels to fluid flow velocity values.

38. The method of claim 37, wherein estimating the velocity of the fluid flow further comprises:
  referencing the look-up table with the determined noise levels to retrieve a corresponding one of the fluid flow velocity values.

39. The method of claim 33, wherein estimating the velocity of the fluid flow further comprises:
  calculating the velocity of the fluid flow using the determined noise levels and a function which relates noise levels to fluid flow velocities.

40. A system for estimating fluid flow velocity, comprising:
  a plurality of sensors distributed over a surface of a body;
  a sensor processing unit configured to:
  maintain a look-up table that relates noise levels to fluid flow velocity values;
  determine noise levels associated with at least a portion of the plurality of sensors due to a fluid flow across the surface of the body, and
  estimate a velocity of the fluid flow based on the determined noise levels.

41. The system of claim 40, wherein the sensor processing unit is further configured to:
  identify sensors of the plurality of sensors that are located on a downstream face of the body.

42. The system of claim 41, wherein the sensor processing unit is further configured to:
  determine noise levels of the identified sensors.

43. The system of claim 40, wherein the body comprises a three dimensional body.

44. The system of claim 40, wherein the three dimensional body comprises at least one of a sphere, a cylinder, and a cone.

45. The system of claim 40, wherein the sensor processing unit is further configured to:
  calculate the velocity of the fluid flow using the determined noise levels and a function which relates noise levels to fluid flow velocities.

46. The system of claim 40, wherein the plurality of sensors comprise pressure sensors.

47. A system for estimating fluid flow direction, comprising:
  a plurality of sensors distributed over a surface of a body;
  means for determining noise levels associated with each of the plurality of sensors due to the fluid flow across the surface of the body;
  means for assigning weights to each of the plurality of sensors based on the determined noise levels; and
  means for estimating the fluid flow direction based on the assigned weights.

48. The method of claim 33, wherein the noise levels comprise root-mean-square (RMS) noise levels.

49. A method of estimating fluid flow velocity, comprising:
  distributing a plurality of sensors over a surface of a body;
  determining noise levels associated with at least a portion of the plurality of sensors due to a fluid flow across the surface of the body;
  maintaining a look-up table that relates noise levels to fluid flow velocity values; and
  estimating a velocity of the fluid flow based on the determined noise levels.

50. The method of claim 49, wherein estimating the velocity of the fluid flow further comprises:
  referencing the look-up table with the determined noise levels to retrieve a corresponding one of the fluid flow velocity values.

51. A system for estimating fluid flow velocity, comprising:
   a plurality of sensors distributed over a surface of a body;
   a sensor processing unit configured to:
      maintain a look-up table that relates noise levels to fluid flow velocity values,
   determine noise levels associated with at least a portion of the plurality of sensors due to a fluid flow across the surface of the body,
   reference the look-up table with the determined noise levels to retrieve a corresponding one of the fluid flow velocity values, and
   estimate a velocity of the fluid flow based on the determined noise levels.

* * * * *